United States Patent Office 3,357,875
Patented Dec. 12, 1967

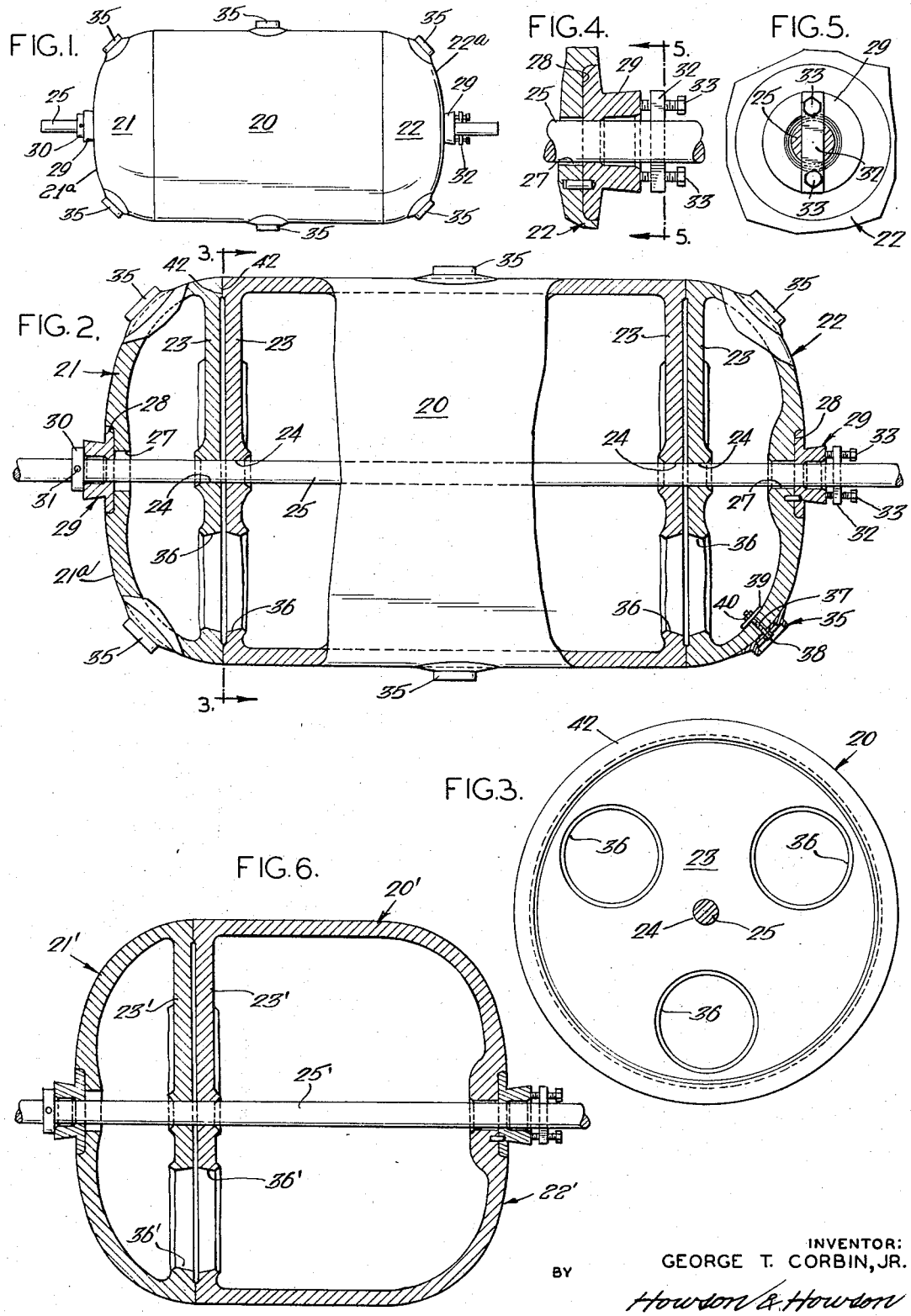

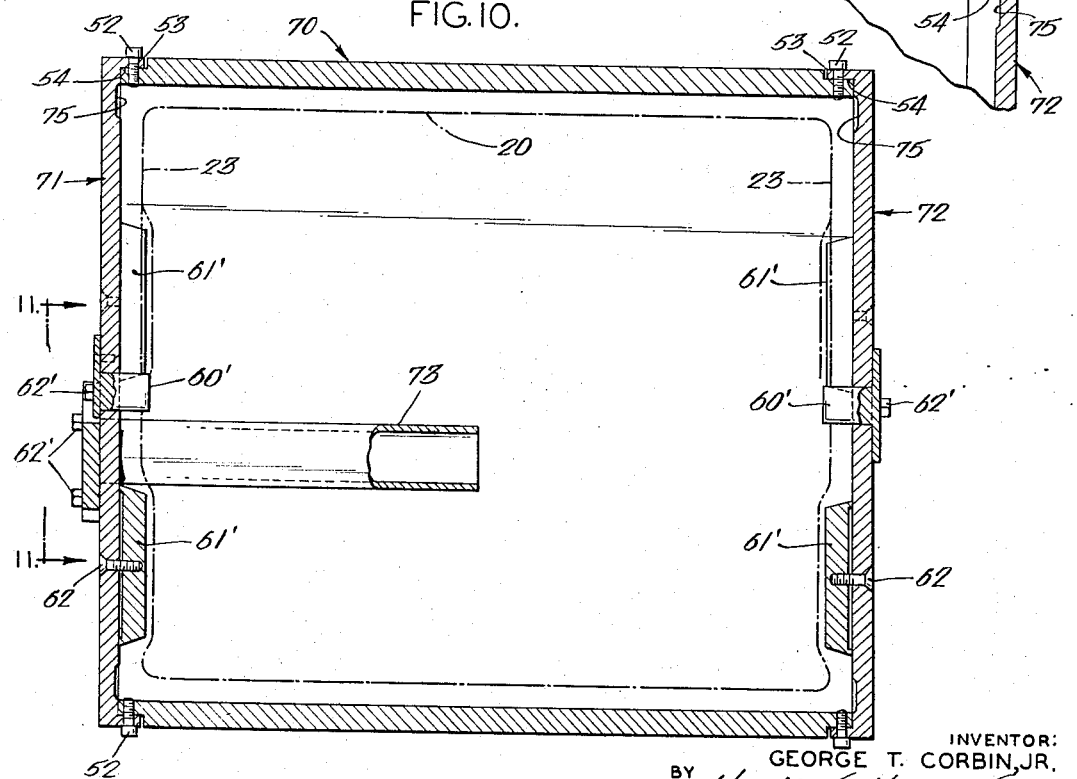

3,357,875
MULTI-PART HOLLOW CASTING
George T. Corbin, Jr., 821 Byberry Road,
Huntingdon Valley, Pa. 19006
Filed Jan. 21, 1963, Ser. No. 252,863
4 Claims. (Cl. 156—425)

This invention relates to a multi-part hollow casting and method and means for making it and has for an object the provision of improvements in this art.

The invention relates particularly to the manufacture of hollow mandrels for use in making filament-wound plastic-bonded hollow vessels, as for rocket fuel cells, the mandrels being made from a water-soluble heat-fusible plastic, such for example as one sold as "paraplast," which can readily be removed from the finished wound vessel by washing or melting it out.

One form of hollow cast plastic mandrel and a method of forming it are disclosed in my copending application, Ser. No. 227,330, filed Oct. 1, 1962, now Patent No. 3,214,506.

The mandrel disclosed in the copending application is a one-piece casting and of a size which is adapted to be made and handled as a one-piece unit. However, there may be conditions or requirements which make is preferable and advantageous to make a mandrel of multiple parts.

One such condition is that in which attachments on the wound vessel are desired. Here it is necessary to provide projecting elements on the outside of the mandrel and to secure them on the inside. Obviously, this cannot be accomplished with a mandrel which is fully enclosed except for a single small end opening.

Another such condition is that in which the size is so great that the mandrel cannot readily be made or handled as a one-piece unit.

According to the present invention, the mandrel or hollow casting is made of a plurality of hollow sub-unit castings, each having a strengthening and positioning element, which are secured together to form a composite hollow mandrel. The strengthening and positioning element of each sub-unit is formed as a wall which after assembly will be disposed interiorly of the assembled mandrel; and when attachments are to be provided on the finished mandrel, the interior wall of each sub-unit is provided with one or more apertures, as may be necessary, to provide interior access for securing the attachments before the sub-units are secured together to form the final mandrel.

The molds in which the mandrel parts are formed provide for the introduction of molten plastic material and are arranged to be turned in a gyratory device, as disclosed in the copending application, to cause the material to solidify inside the mold, the mold and its vents and other elements being modified to cause the new shapes to be produced correctly.

The invention will best be understood from the following description of an exemplary embodiment, reference being made to the accompanying drawings, wherein:

FIG. 1 is a side view of a mandrel made in accordance with the present invention;

FIG. 2 is an enlarged axial section and elevation of the mandrel shown in FIG. 1;

FIG. 3 is a transverse section taken on the line 3—3 of FIG. 2;

FIG. 4 is an enlarged view of a portion of the mandrel shown at the right of FIG. 2;

FIG. 5 is a section taken on the line 5—5 of FIG. 4;

FIG. 6 is a axial section of a modified form of mandrel;

FIG. 7 is an axial section of a mold used to form an end sub-unit of the mandrel;

FIG. 8 is a partial end view looking toward the left from the right of FIG. 7;

FIG. 9 is a fragmentary end view taken on the line 9—9 in FIG. 7;

FIG. 10 is an axial section of a mold used to form an intermediate cylindrical sub-unit of the mandrel;

FIG. 11 is an end view taken on the line 11—11 of FIG. 10;

FIG. 12 is a modification of a joint of FIG. 10.

It may be helpful to describe the environment of one end use for which the invention has especial usefulness. This environment is in the field of jet-propelled objects such as rockets. The directional jets of rockets require a closed container for holding a propellant charge, such as solid fuel, the container having one or more jet nozzles for directional reaction.

In order for such containers to have maximum strength to weight and volume, these containers are commonly made of spun glass fibers wound on a mandrel with a plastic binder to rigidify the walls. The layers of glass fibers are wound in alternating oblique and circumferential directions when the container comprises a cylindrical mid-portion and convex or hemispherical end portions, as is usual.

It is very important that these rocket fuel containers be formed to extremely accurate dimensions and this requires that the mandrels on which they are wound have very precise dimensions and uniform wall thickness throughout all zones in which the wound container is required to have precise dimensions. These zones include all of the cylindrical portion and the convex parts for a considerable distance inward from the outer circumference. The winding tension tends to impose deformations and the heating by the fiber bonding plastic causes some expansion in the mandrel and it can be seen that these and other factors make a uniform mandrel wall desirable.

Since the wound fuel container has only a small opening or openings at one end for nozzle attachment, there is a serious problem in removing the mandrel after the container has been formed and hardened on it. One practice has been to make the mandrel of frangible material, such as plaster of Paris or of bonded sand and, after use, to break it into small pieces for removal through the nozzle opening but this is a very laborious and time consuming task. Moreover the critical interior surface of the container is likely to be harmfully marred in the process of breaking and scraping out the mandrel. The amount of material to be removed can be reduced by making the mandrel hollow and this is now a common practice except for large containers where the usual materials are not strong enough unless made solid.

Recently a composition material has been produced which is well suited for making hard, rigid, strong hollow mandrels. It is referred to as a plastic but it appears to be crystalline and electrolytic and has a latent heat of melting and solidifying like water, and, like water, portions solidfy in the presence of residual liquid, like ice forming in water. One form of such material is marketed under the trade name "Paraplast" by Rezolin Inc. of Santa Monica, Calif. This material is very hard like cement when solid and has the necessary rigidity and strength to make very satisfactory winding mandrels. It is also soluble in water and meltable by heat and this makes easy its removal after the container has been formed. The mandrel is simply dissolved in water (or melted, where the heat will not harm the container) and drained out of the container. This plastic material can be obtained in different types with different melting points of from 300 to 500 degrees F. and can be kept in a clean melted form ready for use in a closed electric resistance melting furnace.

The copending application discloses a method and apparatus for making good hollow mandrels of this material by preheating an assembled mold with an interior filling and vent spout, pouring in the required amount of molten plastic material and turning multi-directionally in a gyratory gimbal device while the material is cooling to harden on the inside of the mold walls.

On the form of multi-part casting or mandrel is shown in FIGS. 1 to 5. As here shown, the mandrel is made in three parts, namely, a central or intermediate cylindrical sub-unit 20 and end sub-units 21 and 22 which are convex or hemispherical on their ends. There may be a plurality of intermediate sub-units, depending on the length of the mandrel. The several sub-units fit together precisely at their adjacent ends to form a smooth continuous outer surface and means are provided for holding the parts together precisely in assembly for use.

The sub-units at their adjacent ends are provided with interior transverse walls 23, each provided with a central hole 24 which closely fits on a clamping shaft or rod 25 which passes through holes in both walls of all units to hold them tightly together and in precisely aligned arrangement.

The intermediate sub-unit 20 has two transverse walls 23 with aligning holes 24 and the inner transverse wall 23 of each end sub-unit has an aligning hole 24. The convex outer end walls 21a, 22a of the end sub-units are provided with oversize holes 27 and recessed sockets 28 which receive an end arbor fitting 29 which will be incorporated in the container which will be formed on the mandrel. The fittings 29 have holes which closely embrace the shaft 25.

Means are provided for clamping the sub-units together by the shaft 25, the means here shown comprising a collar or flange 30 secured on one end of the shaft, as by a pin 31, and an end member 32 secured at the proper location on the other end of the shaft, as by welding, soldering, or (as shown) passing through a hole in the shaft. The member 32 may, if desired, be made as a collar or flange. It carries a plurality of clamp screws 33 which are turned up against the end of the fitting 29 to clamp the sub-units together.

It may be necessary to provide holes and fittings on the wound containers at places other than their ends and this makes it necessary to secure locational fittings on the mandrel sub-units. Such fittings 35 are shown at various places on the sub-units—not necessarily where they will be actually located, because the specifications are variable, but at representative locations.

In order to provide access interiorly for securing these fittings on the mandrel sub-units, the interior transverse strengthening and rigidifying walls 23 are provided with ample access and lightening holes 36 at uniform locations radially and circumferentially where the rotational balance of the mandrel for winding will not be affected. After the mandrel sub-units have been cast a locational drilling jig (not shown) is fitted thereon and holes 37 are drilled for bolts 38 by which the fittings are secured to the mandrel sub-units by washers 39 and nuts 40 before they are clamped together by the shaft 25. FIG. 2 shows how one of these fittings can be secured in place by working inside through an access hole 36.

FIG. 6 shows a modified form of mandrel which due to small size, lightness, or lack of fittings can be made conveniently in two parts, one end sub-unit 21' and integral units 20' and 22'. There is one interior transverse wall 23' for the unit 21' and one for the integrated unit 20'–22', each interior wall having lightening access openings 36'. A shaft 25' connects the parts together. The showing of fittings 35 is omitted from FIG. 6 for convenience but it is assumed that they may be present at desired places.

The molds for casting the sub-units are shown in FIGS. 7 to 11, the mold used for an end sub-unit being shown in FIGS. 7 to 9 and the mold for a cylindrical sub-unit being shown in FIGS. 10 and 11. A mold for making the integrated cylinder-end part 20'–22' of FIG. 6 would be like that shown in FIGS. 7 to 9 except that it would have the open end extended with a cylindrical portion.

The mold shown in FIGS. 7 to 9 includes a convex or hemispherical end belt part 50 and a transverse end part 51 secured thereto by cap screws 52. The parts have peripheral interfitting elements comprising a skirt or sleeve 53 on one part and a mating annular angular recess 54 on the other part. The part which will carry the skirt and which will carry the recess will depend on which end of the mandrel is being made. The parts are made so they will interfit in order from one end of the mold to the other and this, consequently, will cause the mold parts at the ends to have unlike but mating elements. Two end parts could be secured together directly with interfitting elements mated or they could be mated with an intermediate part.

A filling and vent tube 55 having a flange 56 is secured to the concave part 50 at its axis, as by cap screws 57. Dowels 58 assist in securing accurate locational position.

The closed mold, after heating, as explained in the copending application, is secured in a gyratory machine which will wash liquid uniformly over all interior walls during cooling so as to produce walls of uniform thickness where there is uniform heat loss. Where it is desired to have thinner walls, the mold is provided with means which will provide slower heat transfer or "heat sink" to the desired part of the casting wall inside. The reduced heat sink could be provided by heat insulation or by heat-holding means, such as metallic mold walls of greater thickness. The latter arrangement is shown herein, a central thick fitting 60 being provided where a central end opening is desired, and thick disks 61 being secured where lightening openings in the transverse wall are desired. Screws 62 hold the fittings in position.

The general configuration of the mandrel part which is formed is shown in broken lines in FIG. 7. Here the outer wall 21a and the transverse wall 23 can be identified. No attempt is made to show a mold for making a part exactly like the mandrel end part 21 shown in FIG. 2.

In FIGS. 10 and 11 there is shown a mold for making the cylindrical sub-unit of the mandrel. Here there is a cylindrical mold part 70 and end plate parts 71 and 72. Plugs 60' and thick disks 61' secured by screws 62' are used as in FIG. 7. Since both transverse walls 23 will be disposed interiorly in the assembled mandrel and since no metal inserts can well be used interiorly, the plugs 60' are needed to form the central guide holes (corresponding to 24 in FIG. 2) very accurately in the end walls 71 and 72, and it is arranged that the fill and vent tube 73 will be offset from the central axis, as best shown in FIG. 11. A hole is left in the end wall when the tube is removed but it is relatively small and near the axis so that no ill effects of the slight eccentricity will be met during winding on the assembled mandrel.

The mandrel part which is formed in the mold of FIGS. 10 and 11 is shown in broken lines to comprise an outer cylindrical part 20 and end walls 23.

The skirts or sleeves 53 and annular recesses 54 in FIG. 10 are alike but FIG. 12 shows how they could be arranged for universal interfit of the mold parts. A mold for the other end part of the mandrel would be made as in FIG. 12 and not as in FIGS. 7 and 10. The reason for using the parts 71, 72, which in general shape are identical, in FIG. 10 is that there is no draw over the cast material during removal of the end plates.

It will be noted that in all cases the end plates are formed with annular recesses 75 which form annular projections 42 on the ends of the transverse walls, leaving the interior portions spaced apart, as shown in FIGS. 2 and 6.

After the desired sub-units have been cast they are assembled with the end walls adjacent and the outer annular projections 42 together and the assembly clamped together on the shaft 25, all needed fittings 35 having been secured to the sub-units before assembly. If desired, the outer surfaces and the ends of the flanges 42 can be machined after the parts have hardened and cooled. By this procedure, much greater precision can be obtained than if a complete mandrel were cast at one time.

It is thus seen that the invention provides an improved mandrel or hollow casting formed of a plurality of parts which provides for great precision in manufacture, enables fittings to be applied before the parts are assembled, gives great interior strength by reason of the interior walls, yet avoids making a solid mandrel, enables mandrels of very large size to be made, and provides improved method and apparatus for manufacture. It will be understood that while a specific cast material for a specific use has been described as one illustrative embodiment, this implies no limitation on the kind of material which may be used for forming the castings.

While certain embodiments of the invention have been described for purposes of illustration, it is to be understood that there may be various embodiments and modifications within the general scope of the invention.

I claim:

1. A composite, hollow, liquefiable mandrel, comprising a plurality of hollow sub-unit castings of a liquefiable material, each having an exterior wall forming a part of the exterior surface of said composite mandrel and each having at least one interior transverse wall integral with said exterior wall and extending inwardly from said exterior wall; and means securing together said sub-unit castings with said interior transverse walls of adjacent ones of said sub-units disposed adjacent and confronting each other.

2. The composite hollow mandrel of claim 1, in which said securing means comprises a member extending through opposite exterior surface regions of said composite mandrel and through said transverse walls of said sub-units in closely-fitting relation to said transverse walls and clamping means on said member exterior of said composite mandrel and bearing against said opposite exterior surface regions for clamping together said sub-unit castings.

3. The composite hollow mandrel of claim 1, in which at least one of each adjacent confronting pair of said transverse walls is recessed from the adjacent end of the sub-unit casting of which it is a part to provide a projecting peripheral portion of said exterior wall on said last-named sub-unit casting which abuts the exterior wall of the adjacent sub-unit casting, whereby a smooth substantially continuous exterior surface for said composite casting is provided and said adjacent transverse walls of said pair are spaced apart.

4. The composite hollow casting of claim 1, in which said composite mandrel is coaxial with and balanced about an axis therethrough, said transverse walls are balanced about and normal to said axis, said securing means comprise a clamping shaft extending along said axis, and at least one of said transverse walls is apertured in a region spaced from said axis to provide access to the interior of the sub-unit casting of which it is a part.

References Cited
UNITED STATES PATENTS

| | | | |
|---|---|---|---|
| 1,805,032 | 5/1931 | Berwick | 18—6 |
| 2,042,975 | 6/1936 | West | 18—26 |
| 3,083,409 | 4/1963 | Crawford et al. | |
| 3,083,864 | 4/1963 | Young | 220—83 |
| 3,220,910 | 11/1965 | Walkey | 156—155 X |

EARL M. BERGERT, *Primary Examiner.*

J. J. BURNS, H. F. EPSTEIN, *Assistant Examiners.*